UNITED STATES PATENT OFFICE 2,583,268

PROCESS OF PREPARING COLD-SWELLING STARCH PRODUCTS

Jan Lolkema, Hoogezand, and Willem Albertus van der Meer, Haren, Netherlands, assignors to Naamlooze Vennootschap: W. A. Scholten's Chemische Fabrieken, Groningen, Netherlands, a corporation of the Netherlands No Drawing. Application March 19, 1948, Serial No. 15,956. In the Netherlands March 25, 1947

6 Claims. (Cl. 260—14)

In U. S. patent application Serial No. 707,325, now Patent 2,562,558, issued July 31, 1951, a process of producing starch preparations soluble in cold water, is described which consists in that a mixture of starch or a starch derivative, an aminotriazine and an aldehyde or a substance capable of producing an aldehyde, is subjected to the so called cold-swelling starch process in an approximately neutral or alkaline medium. By the expression "cold-swelling starch process" a treatment is understood which consists in that the starch or the starch derivative mixed with a limited quantity of water, is for a short time heated above the gelatinizing point and pressed out to form thin layers, the mass being dried simultaneously or immediately thereafter.

This treatment is preferably carried out by feeding the mixture onto rotating cylinders heated to 100° C. or higher, which are so positioned or constructed that the mass is pressed out or spread out into a thin layer by mechanical pressure. According to the U. S. patent application Serial No. 707,325 products are obtained which, just as ordinary cold swelling starch, will dissolve in cold water; if, however, these solutions after the addition of a catalyst, more particularly an acid or a compound capable of producing an acid, are dried on a carrier at higher temperatures, water-resistant layers are formed. The products thus obtained are used as finishing and sizing agents, adhesives, binding agents and the like.

We have found that valuable starch preparations may likewise be produced by subjecting a mixture of starch or a starch derivative and a limited quantity of water to which a phenol and an aldehyde or a substance capable of producing an aldehyde have been added, to the said cold-swelling starch process in a slightly acid, neutral or alkaline medium. In this case two products are obtained which just as cold swelling starch, will dissolve in cold water but the solutions of which after the addition thereto of a catalyst, will yield water resistant layers when dried at high temperatures and which form excellent adhesives and binding, finishing and sizing agents.

Starch materials suitable for this purpose are the various native starches, including the so called "waxy" starches, e. g. waxy maize starch, soluble starch, dextrin, ethers and/or esters of starch still containing free hydroxyl groups, mixtures of the said starch materials with other water-soluble polysaccharides and natural or artificial mixtures of starch or starch derivatives with proteins and, if desired, cellulose, for example: wheat, rye, buckwheat or oats, mixtures of starch and casein or the like. It is also possible, for instance, to start from potatoes as such, in which case they may previously be subjected to a boiling or steaming process in peeled or unpeeled condition.

As phenols monohydric or polyhydric, alkylated or non-alkylated phenols or mixtures of phenols may be used, e. g. phenol, p-tertiary butyl phenol, cresol, xylenol, resorcinol, mixtures of phenol with m-cresol or resorcinol and the like.

We may also use mixtures of phenols with aminotriazines e. g. melamine or with materials containing an aminotriazine, which may be obtained, for example, by heating dicyanodiamide with monohydric or polyhydric phenols (cf. British Patent Specification 562,331).

The addition of melamine to a mixture containing phenol will generally result in readily setting products being obtained so that such mixed condensation products may in many cases be advantageously used.

The term "formaldehyde" also includes substances yielding formaldehyde such as paraformaldehyde, trioxymethylene and the like. As substances yielding aldehyde the aldehyde - cold swelling starches prepared in accordance with the U. S. Patent No. 2,246,635 and the U. S. patent applications Serial Nos. 707,321 and 707,326, now Patents 2,575,423, issued November 20, 1951, and 2,510,748, issued June 6, 1950, respectively, may also be used.

If desired the phenol and the aldehyde may be added in the form of pre-condensates which may be either or not etherified and/or esterified.

We have found that the most soluble products are obtained in a neutral or weakly alkaline medium viz. at a pH ranging from 7-10. When using a pH of 5 the products obtained generally are also soluble whereas this often is not the case at a pH of 4. It is clear, however, that the lower limit of the pH depends on the percentages of phenol and aldehyde used and in particular on the temperature during the cold swelling starch process. This process is preferably carried out at the lowest temperature possible, if desired, under sub-atmospheric pressure because products having the best solubility are then obtained. The use of precondensates of the phenol and the aldehyde in etherified condition also has a favorable influence on the solubility of the final product.

Just as in the process described in the U. S. patent application Serial No. 707,325 it is advantageous to produce preparations which contain the starch molecule in more or less decomposed condition and which have been obtained by adding, prior to or during the cold-swelling starch process, chemicals decomposing the starch e. g. alkalis and/or oxidizing agents. The preparations obtained by using decomposed cold swelling starches dissolve more readily in water, are better capable of maintaining the synthetic resin components or precondensates in solution or suspension yield a more uniform solution, and have still other advantages.

The properties of these decomposed cold swelling starch products may still be improved by partly or entirely etherifying and/or esterifying the same, e. g. in accordance with the U. S. patent application Serial No. 380,562, now Patent 2,459,108, issued January 11, 1949.

According to an embodiment of the invention other polysaccharides, for example cellulose derivatives, are also added to the mixture to be subjected to the cold-swelling starch process. For this purpose the water-soluble alkyl- or hydroxyalkyl ethers of cellulose are particularly suited. These mixtures are of importance i. e. for obtaining finishing and sizing agents and adhesives having special properties. The polysaccharides may be added prior to, during or after the cold swelling starch process. If the polysaccharides are used in the form of an ether or ester the etherification or esterification may also be carried out simultaneously with the etherification or esterification of the starch. It is possible, for example, to start from mixtures of starch and alkali soluble cellulosic products, such as e. g. alkali soluble methyl or hydroxyethyl cellulose, and to etherify the said mixtures in well known manner in an alkaline medium whereby completely water soluble products may be obtained.

According to the invention both pre-condensates of the phenol and the aldehyde capable of being hardened (resol-type) and those not capable of being hardened (novolak type) may be employed.

In order to obtain insoluble products it is necessary in the last mentioned case to add to the product obtained an additional quantity of aldehyde, in the same way as in the case of moulding powders on novolak basis to which Urotropine is often added with a view to the final complete hardening.

According to an embodiment of the U. S. patent application Serial No. 707,325 such a proportion of a nonvolatile or slightly volatile acid and/or a substance producing an acid when heated, is added to the preparations obtained that a solution of the concentration required for their use has a pH of at least 5 and remains fit to be used for a sufficient period of time, but that when drying the solution on a carrier at high temperatures the required acid reaction is created. Thus the advantage is gained for example that the solutions may be used for finishing at moderately elevated temperatures, without premature gelatinization. This step may also be used in the present process; it is, however, mostly unnecessary in this process because the solutions of the starch preparations obtained according to the invention are more stable than those obtained according to the U. S. patent application Serial No. 707,325, so that also after the addition of the acid required for the final hardening, they mostly remain fit to be used for a sufficient period of time.

The cold swelling starch preparations obtained according to the invention are distinguished from the prior products as disclosed in U. S. Patent No. 2,246,635 in that they contain both the aldehyde and the synthetic resin component embedded within the cold swelling starch particles, whereas the said prior products consist of a mixture of cold swelling starch particles having formaldehyde embedded therein and separate particles consisting of or containing a synthetic resin component.

As a catalyst for the condensation of the phenol with the aldehyde, acid, neutral or basic substances may be used.

If desired, the catalyst may already be added to the dry product obtained in accordance with the invention, for example in the form of a cold-swelling starch preparation. In the absence of water no appreciable reaction will occur. A limited quantity of ordinary cold swelling starch or starch or a starch derivative that does not swell or dissolve in cold water may be added to the products obtained according to the invention. This will also react when the solutions of the cold-swelling starch preparations in question are dried or heated when actually used.

The starch preparations obtained according to the invention are e. g. excellently suitable as moulding powders, in which case the usual fillers, such as wood meal, sawdust, cellulose waste, cotton fibres, asbestos fibres, cellulose derivatives, comminuted straw, strawboard and the like may be added.

For the rest the measures disclosed in U. S. patent application Serial No. 707,325 may in general be applied to the present process.

The invention will be illustrated by the following examples.

Example I 1000 parts by weight of potato starch are suspended in a mixture of 140 parts by weight of phenol, 170 parts by volume of commercial formaline of about 38% by volume and 620 parts by volume of water and this suspension is brought to a pH of 9 by adding 1-N-sodium hydroxide. The suspension thus prepared is subjected to the cold swelling starch process under a steam pressure of 3-4 atmospheres in the cylinder. The cold swelling starch formed readily dissolves in 8-10 parts of cold water while forming a viscous, smooth solution.

If the cold-swelling starch process is carried out at a pH of 4, the other circumstances being the same, an insoluble product is obtained which only swells to a limited degree, while at a pH of 5 a soluble, slowly swelling product is formed.

Example II

A mixture of 126 parts by weight of finely ground p-cresol-dialcohol having a melting point of 128° C., 1000 parts by weight of tapioca starch and 1500 parts by volume of water is adjusted to a pH of 7 by means of dilute sodium hydroxide. The mixture is subsequently converted into cold swelling starch in well known manner on a heated, rotating cylinder at a temperature of about 120–130° C. A dry cold swelling starch preparation is obtained which is readily soluble in cold water.

Example III

A suspension of 500 parts by weight of potato starch in a mixture of 70 parts by weight of phenol; 170 parts by volume of commercial formaldehyde of about 38 per cent by volume and 310 parts by volume of water is subjected to the cold swelling starch process at a pH of 5 and under a steam pressure of 3-4 atmospheres. A cold swelling starch preparation is obtained which yields a viscous, smooth and transparent solution when dissolved in 8-10 parts of cold water.

If the cold swelling starch process is carried out in a decidedly acid medium, by adding to the above suspension 20 parts by volume of phosphoric acid of 68 per cent by weight, under otherwise similar circumstances, a completely insoluble product is obtained which swells only to a very limited degree in water.

Example IV

A mixture of 80 parts by weight of phenol, 20 parts by weight of melamine, 200 parts by volume of commercial formaldehyde of 40 per cent by volume and 5 parts by volume of a 30% sodium hydroxide solution is heated for so long a time in a boiling water bath while refluxing the mixture that a sample of the reaction mixture when diluted with 4 parts of water becomes permanently turbid. The solution of the mixed condensation product thus prepared is added to a suspension of 1000 parts by weight of potato starch in 700 parts by volume of water. The mixture is subsequently subjected to the cold-swelling starch process in a neutral medium at a temperature of about 120-130° C., a product soluble in cold water being obtained.

Example V 200 parts by weight of phenol are condensed in the presence of 10 parts by volume of a 30% sodium hydroxide solution and 240 parts by volume of commercial formaldehyde of 40% by volume at a temperature of 80-90° C. for so long a time that a sample of the reaction mixture in a neutral medium just gives a permanent turbidity with 1-2 parts of water. The solution of the resol thus prepared is subsequently added to a mixture of 500 parts by weight of waxy maize starch, 500 parts by weight of a dextrin of medium viscosity and 500 parts by volume of water and thereupon the mass is converted into cold swelling starch at a pH of 8 and under a pressure of 4 atmospheres in the usual manner. The cold swelling starch produced is readily soluble in cold water.

Example VI

A mixture of 1000 parts by weight of American wheat flour and 1000 parts by volume of water is heated with 100 parts by weight of a 30% sodium hydroxide solution and 50 parts by volume of a 3% hydrogen peroxide solution at an elevated temperature during 1-2 hours. Thereafter 1500 parts by weight of a liquid condensation product of phenol and formaldehyde of a restricted solubility in water are added. The said condensation product has been prepared by condensing 1 molecule of commercial phenol with about 1½ mol. of formaldehyde in an alkaline medium for such a period, that the reaction mixture after neutralization of the alkali gives a permanent turbidity in 1-2 parts of water. The mixture is subjected to the cold swelling starch process in an approximately neutral medium and under a steam pressure of 4-5 atmospheres. The product thus prepared readily dissolves in cold water and yields a smooth, unctuous viscous mass with 1 to 2 parts of water.

Example VII 400 parts by weight of an alkali soluble commercial hydroxy-ethyl cellulose are dissolved in 4000 parts by volume of a 8% sodium hydroxide solution. This solution is intimately mixed with 1200 parts by weight of potato starch and 200-300 parts by weight of ethylene oxide are introduced into the mixture at a temperature of 50-60° C. while stirring. After a reaction time of 2-3 hours the alkaline mass is neutralized with concentrated hydrochloride acid and thereupon 1250 parts by weight of the liquid condensation product of phenol and formaldehyde referred to in Example VI are added. The mixture thus prepared is subjected to the cold swelling starch process in a neutral medium and under a steam pressure of 3-4 atmospheres.

A dry product is obtained which is readily soluble in cold water. When using a steam pressure of 6-8 atmospheres and the same pH products are obtained that are less soluble or insoluble.

We claim:

1. A process of manufacturing starch preparations soluble in cold water to solutions which after the addition of a catalyst for the condensation when dried on the surface of a material will produce insoluble films which comprises heating a mixture having a pH of at least 5 of a starch material containing free hydroxyl groups, water, a material from the group consisting of a mixture of a phenol and formaldehyde, a mixture of a phenol, melamine and formaldehyde, a precondensate of a phenol and formaldehyde and a precondensate of a phenol, melamine and formaldehyde on a rotary drum to a temperature adapted to remove the water and to gelatinize the starch material, while pressing out the said mixture under mechanical pressure to a thin layer which is simultaneously dried and comminuting the dry film.

2. A process of manufacturing dry starch preparations soluble in cold water to solutions which after the addition of a catalyst for the condensation when dried on the surface of a material will produce insoluble films, which comprises heating a mixture having a pH of at least 5 of a starch ether containing free hydroxyl groups, water, and a material from the group consisting of a mixture of a phenol and formaldehyde, a mixture of a phenol, melamine and formaldehyde, a precondensate of a phenol and formaldehyde and a precondensate of a phenol, melamine and formaldehyde on a rotary drum to a temperature adapted to remove the water and to gelatinize the starch material, while pressing out the said mixture under mechanical pressure to a thin layer, which is simultaneously dried and comminuting the dry film.

3. A process of manufacturing dry starch preparations soluble in cold water to solutions which after the addition of a catalyst for the condensation when dried on the surface of a material will produce insoluble films which comprises heating a mixture having a pH of at least 5 of a starch material containing free hydroxyl groups, water, and a material from the group consisting of a mixture of a phenol and formaldehyde, a mixture of a phenol, melamine and formaldehyde, a precondensate of a phenol and formaldehyde and a precondensate of a phenol, melamine and formaldehyde on a rotary drum to a temperature adapted to remove the water and to gelatinize the starch material, while pressing out the said mixture under mechanical pressure to a thin layer which is simultaneously dried, comminuting the dry film and subsequently mixing the dry product with a catalyst for the condensation.

4. A process of manufacturing dry starch preparations soluble in cold water to solutions which after the addition of a catalyst for the condensation when dried on the surface of a material will produce insoluble films which comprises heating a mixture having a pH of at least 5 of a starch material containing free hydroxyl groups, water, and a material from the group consisting of a mixture of a phenol and formaldehyde, a mixture of a phenol, melamine and formaldehyde, a precondensate of a phenol and formaldehyde and a precondensate of a phenol, melamine and formaldehyde on a rotary drum to a temperature adapted to remove the water and to gelatinize the starch material, while pressing out the said mixture under mechanical pressure to a thin layer which is simultaneously dried, comminuting the dry film and subsequently mixing the dry product with a cold swelling starch containing a catalyst embedded within the cold swelling starch particles.

5. A process of manufacturing dry starch preparations soluble in cold water to solutions which after the addition of a catalyst for the condensation when dried on the surface of a material will produce insoluble films, which comprises heating a mixture having a pH of at least 5 of a starch material containing free hydroxyl groups and another water soluble high polymeric polysaccharide, water, and a material from the group consisting of a mixture of a phenol and formaldehyde, a mixture of a phenol, melamine and formaldehyde, a precondensate of a phenol and formaldehyde and a precondensate of a phenol, melamine and formaldehyde on a rotary drum to a temperature adapted to remove the water and to gelatinize the starch material, while pressing out the said mixture under mechanical pressure to a thin layer, which is simultaneously dried and comminuting the dry film.

6. Dry starch preparations soluble in cold water to solutions which after the addition of an acid catalyst for the condensation when dried on the surface of a material will produce insoluble films, comprising particles of a cold swelling starch ether containing free hydroxyl groups and having a material from the group consisting of a mixture of a phenol and formaldehyde, a mixture of a phenol, melamine and formaldehyde, a precondensate of a phenol and formaldehyde and a precondensate of a phenol, melamine and formaldehyde homogeneously distributed throughout each cold swelling starch ether particle.

JAN LOLKEMA.
WILLEM ALBERTUS van der MEER.

REFERENCES CITED

The following references are of record in the file of this patent:

UNITED STATES PATENTS

| Number | Name | Date |
|---|---|---|
| 2,246,635 | Moller | June 24, 1941 |
| 2,302,309 | Glarum | Nov. 17, 1942 |
| 2,328,592 | Widmer | Sept. 7, 1943 |
| 2,400,820 | Glarum | May 21, 1946 |